United States Patent Office 3,101,369
Patented Aug. 20, 1963

---

3,101,369
NEW BORAZOLE COMPOSITIONS
Robert J. Brotherton, Fullerton, and Allen L. McCloskey, Orange, Calif., assignors to United States Borax & Chemical Corporation, Los Angeles, Calif., a corporation of Nevada
No Drawing. Filed Aug. 28, 1961, Ser. No. 134,107
5 Claims. (Cl. 260—551)

The present invention relates as indicated to new borazole compositions and has more particular reference to boron-boron bonded diborazole and to a method for preparing the same.

It is, therefore, the principal object of this invention to provide as new compositions, the boron-boron bonded diborazoles.

It is a further object of the present invention to provide an efficient method for preparing the boron-boron bonded diborazoles.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises, as new compositions of matter, the boron-boron bonded diborazoles having the formula:

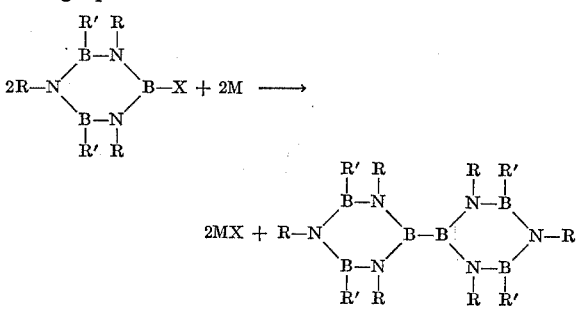

where R and R' are selected from the group consisting of alkyls of from 1 to 6 carbon atoms and phenyl.

The preparation of the boron-boron bonded diborazoles of the present invention can best be illustrated by the following equation:

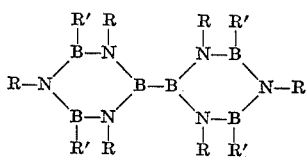

where

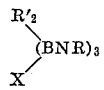

is an unsymmetrical monofunctional haloborazole, R and R' are alkyl radicals of from 1 to 6 carbon atoms or phenyl and which can be the same or different, X is either chlorine or bromine, and M is either an alkali metal, sodium amalgam, or sodium and potassium alloys.

The preferred method for performing the above reaction is to add an unsymmetrical monofunctional haloborazole and one of the defined metals, having a continuously available clean active surface, together in a substantially anhydrous hydrocarbon solvent. The resultant reaction mixture is then heated under reflux, in an inert atmosphere, with constant agitation, for a period of from about 1 to about 8 hours, and the resultant reaction mass is cooled to about ambient temperature. The solids, the halogen salt of the metal reactant, are removed from the cooled reaction mass by filtration, and the desired boron-boron bonded diborazole is then recovered from the filtrate.

As defined previously, the metals which are applicable as reactants for preparing the boron-boron bonded diborazoles are the alkali metals, sodium amalgam, and sodium and potassium alloys. It will be noted that in the foregoing paragraph the metal used is specifically described as having a continuously available clean active surface. This is of utmost importance for the reaction to proceed to completion and to obtain maximum yields of product. To have a continuously available clean active surface the metal must be either dispersed in a very small particle size or be in a liquid or molten condition. Thus, in effect, it is necessary to have the metal in such a physical condition where it presents a maximum surface area and which provides a continuously available clean active surface for reaction with the unsymmetrical monofunctional haloborazole.

The unsymmetrical monofunctional haloborazoles applicable as reactants in the preparation of the present boron-boron bonded diborazoles have the formula:

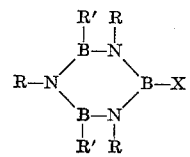

where R and R' are alkyls of from 1 to 6 carbon atoms or phenyl and which can be the same or different, and X is either chlorine or bromine. The following list is illustrative of the unsymmetrical monofunctional haloborazoles applicable to the present invention:

B-chloro-B-dimethyl-N-trimethylborazole
B-chloro-B-diethyl-N-tri-n-propylborazole
B-bromo-B-diisoamyl-N-triethylborazole
B-chloro-B-di-n--butyl-N-trimethylborazole
B-bromo-B-dimethyl-N-triisopropylborazole
B-bromo-B-di-n-hexyl-N-tri-n-butylborazole
B-chloro-B-diethyl-N-triethylborazole
B-chloro-B-diisopropyl-N-tri-n-propylborazole
B-bromo-B-di-sec-butyl-N-trimethylborazole
B-bromo-B-dimethyl-N-tri-n-hexylborazole
B-chloro-B-diphenyl-N-trimethylborazole
B-bromo-B-diethyl-N-triphenylborazole It is to be clearly understood that the foregoing list is only a partial enumeration of the unsymmetrical monofunctional haloborazoles applicable to the present invention and is not intended to limit the invention.

The unsymmetrical haloborazoles can be prepared by reaction of a B-trihalo-N-organoborazole with less than 3 moles of phenyllithium or an alkyllithium, as described by Groszos and Stafiej, United States Patent No. 2,892,869, issued June 30, 1959, or they can be prepared by reaction of a B-trichloro-N-organoborazole with a Grignard reagent as described by Ryschkewitsch et al., J. Am. Chem. Soc. 80, 4515–7 (1958).

As regards the hydrocarbon solvents which function as the reaction medium in which the present reaction is performed, these can be selected from the common and readily commercially available hydrocarbon solvents. Such hydrocarbon solvents as:

Benzene
Heptane
Xylene
Hexane
Toluene
Mineral oil are all applicable to the present invention. The choice of solvent being dependent, naturally, on the temperature at which the reaction is conducted.

So that the present invention can be more clearly understood, the following examples are given for illustrative purposes:

I

A solution of 10.08 grams (0.374 mole) of B-chloro-B-di-n-butyl-N-trimethylborazole in 60 ml. of xylene was added with vigorous stirring to a dispersion of 1.7 grams (0.074 mole) of sodium in 200 ml. of xylene. The reaction mixture was heated under reflux in a nitrogen atmosphere with continuous vigorous agitation for a period of about 7 hours. The resultant reaction mass was cooled to about ambient temperature and the solids present were removed by filtration. The xylene was removed by vacuum distillation and a yellow-brown semisolid boron-boron bonded diborazole, B,B-bis(B-di-n-butyl-N-trimethylborazole), was recovered as the residue. Chemical analysis of the product yielded the following data:

Calculated for $C_{22}H_{54}B_6N_6$: B=13.88%; mol. wt.=468. Found in product: B=13.18%; mol. wt.=487.

II

Example I was repeated except that highly dispersed potassium was used as the active metal instead of highly dispersed sodium. The product of this example was comparable to the product of Example I.

III

A solution of 21.19 grams (0.062 mole) of B-bromo-B-diethyl-N-tripropylborazole in 100 ml. of toluene was added with vigorous stirring to a dispersion of 2.1 grams (0.091 mole) of sodium in 250 ml. of toluene. The reaction mixture was heated under reflux in a nitrogen atmosphere with continuous vigorous agitation for a period of about 5 hours. The resultant reaction mass was cooled to about ambient temperature and the solids present were removed by filtration. The toluene was removed by vacuum distillation and a yellow-brown semisolid boron-boron bonded diborazole, B,B-bis(B-diethyl-N-tripropylborazole), was recovered as the residue. Chemical analysis of the product yielded the following data:

Calculated for $C_{26}H_{62}B_6N_6$: B=12.40%; mol. wt.=524. Found in product: B=12.01%; mol. wt.=538.

IV

Example III was repeated except that sodium amalgam was used as the active metal instead of sodium. The product of this example was comparable to that of Example III.

V

A solution of 20.36 grams (0.110 mole) of B-chloro-B-dimethyl-N-trimethylborazole in 100 ml. of benzene was added with vigorous stirring to a dispersion of 5.8 grams (0.187 mole) of potassium in 400 ml. of benzene. The reaction mixture was heated under reflux in a nitrogen atmosphere with continuous vigorous agitation for a period of about 2 hours. The resultant reaction mass was cooled to about ambient temperature and the solids present were removed by filtration. The benzene was removed by vacuum distillation and an off-white semisolid boron-boron bonded diborazole, B,B-bis(B-dimethyl-N-trimethylborazole), was recovered as the residue. Chemical analysis of the product yielded the following data:

Calculated for $C_{10}H_{30}B_6N_6$: B=21.69%; mol. wt.=299.3. Found in product: B=21.14%; mol. wt.=315.

VI

Example V was repeated except that highly dispersed sodium was used as the active metal instead of highly dispersed potassium. The product of this example was comparable to the product of Example V.

VII

A solution of 31 grams (0.1 mole) of B-chloro-B-diphenyl-N-trimethylborazole in 100 ml. of benzene was added with constant vigorous agitation to a dispersion of 350 grams (0.15 mole) of a 1% sodium-amalgam in 300 ml. of benzene. The reaction mass was heated under reflux in a nitrogen atmosphere with constant vigorous agitation for about 4 hours. The reaction mass was then cooled to about ambient temperature and the solids present were removed by filtration. The benzene was removed from the filtrate by vacuum distillation and a solid boron-boron bonded diborazole, B,B-bis(B-diphenyl-N-trimethylborazole), was recovered. Chemical analysis of the product yielded the following data:

Calculated for $C_{30}H_{38}N_6B_6$: B=5.92%; mol. wt.=547. Found in product: B=5.81%; mol. wt.=551.

The boron-boron bonded diborazoles are of great interest as chemical intermediates and they have been found to have a number of industrial as well as chemical applications. These compounds find utility as herbicides when used alone or in combination with other known herbicidal compositions, as reducing agents, as polymer intermediates, and as epoxy resin curing agents and hardeners.

Other modes of applying the principle of the invention may be employed, change being made as regards the details described, provided the features stated in any of the following claims or the equivalent of such be employed.

We, therefore, particularly point out and distinctly claim as our invention:

1. Boron-boron bonded diborazoles having the formula

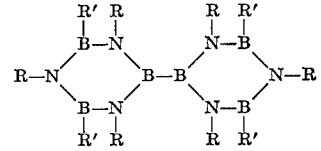

where R and R' are selected from the group consisting of alkyls of from 1 to 6 carbon atoms and phenyl.
2. B,B-bis(B-di-n-butyl-N-trimethylborazole).
3. B,B-bis(B-diethyl-N-tripropylborazole).
4. B,B-bis(B-dimethyl-N-trimethylborazole).
5. B,B-bis(B-diphenyl-N-trimethylborazole).

References Cited in the file of this patent
UNITED STATES PATENTS
2,974,165    Brotherton et al. _____ Mar. 7, 1961